US011493948B2

(12) United States Patent
Giesselmann

(10) Patent No.: US 11,493,948 B2
(45) Date of Patent: Nov. 8, 2022

(54) SENSOR-DATA PROCESSING DEVICE

(71) Applicant: Robert Bosch GmbH, Stuttgart (DE)

(72) Inventor: Timo Giesselmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/968,112

(22) Filed: May 1, 2018

(65) Prior Publication Data
US 2018/0348810 A1    Dec. 6, 2018

(30) Foreign Application Priority Data

May 31, 2017    (DE) .......................... 102017209132.0

(51) Int. Cl.
*G06F 1/04* (2006.01)
*H04J 3/06* (2006.01)
*G08C 15/00* (2006.01)
*H04Q 9/00* (2006.01)

(52) U.S. Cl.
CPC .............. *G06F 1/04* (2013.01); *G08C 15/00* (2013.01); *H04J 3/0638* (2013.01); *H04Q 9/00* (2013.01)

(58) Field of Classification Search
CPC .... F06F 1/04; G06F 1/04; G08C 15/00; H04J 3/0638; H04Q 9/00
See application file for complete search history.

(56) References Cited

U.S. PATENT DOCUMENTS

| 8,462,821 | B1* | 6/2013 | Sagarwala | H04J 3/0667 |
| | | | | 370/503 |
| 10,860,197 | B1* | 12/2020 | Gibeau | G06F 11/323 |
| 2019/0050021 | A1* | 2/2019 | Schumacher | G06F 11/3636 |

FOREIGN PATENT DOCUMENTS

| CN | 104254761 A | 12/2014 |
| CN | 106707873 A | 5/2017 |
| JP | 2008118549 A | 5/2008 |
| JP | 2015119257 A | 6/2015 |
| WO | 2017015222 A1 | 1/2017 |

* cited by examiner

*Primary Examiner* — Nitin C Patel
(74) *Attorney, Agent, or Firm* — Norton Rose Fulbright US LLP; Gerard Messina

(57) ABSTRACT

A sensor-data processing device, including at least one interface to communicate with at least one sensor element for detecting sensor events; at least one interface to communicate with at least one external computer device for processing sensor data representing the sensor events; devices for generating at least one time base specific to the sensor-data processing device; a device for assigning time stamps to the sensor events, the time stamps being based on the time base of the sensor-data processing device and being specific to the sensor-data processing device; a device for receiving a request signal from the computer device; with the aid of the computer device, the request signal being able to be assigned a time stamp based on a time base specific to the computer device; and a device for assigning a time stamp specific to the sensor-data processing device, to the request signal.

15 Claims, 3 Drawing Sheets

SENSOR-DATA PROCESSING DEVICE

CROSS REFERENCE

The present application claims the benefit under 35 U.S.C. § 119 of German Patent Application No. DE 102017209132.0 filed on May 31, 2017, which is expressly incorporated herein by reference in its entirety.

FIELD

The present invention relates to a sensor-data processing device. The present invention further relates to a sensor system. In addition, the present invention relates to a method for determining conversion parameters to convert time stamps of a sensor-data processing device, specific to the sensor-data processing device, to time stamps of a computer device, specific to the computer device, within the scope of a sensor system.

BACKGROUND INFORMATION

Sensor components, which include at least one MEMS sensor element and a so-called sensor hub, are conventional. With the aid of the MEMS sensor element, one or more measurable physical quantities (e.g., acceleration, yaw rate, etc.) are measured and converted to corresponding electrical sensor signals. The sensor hub is a microcontroller, which processes further the sensor signals for selected applications and, in this manner, generates digitized sensor data. The design of the sensor hub provides for the sensor-signal processing of the sensor hub to take place continuously, even if a connected host processor is deactivated.

Thus, the sensor hub generates continuously digitized sensor data, which are stored in a FIFO (first-in first-out register). In addition, the sensor hub detects sensor events, which are defined by the applications, and in the case of a sensor event, it generates at least one interrupt signal, which wakes up the connected host processor; the host processor being able to retrieve the sensor data as required, via an interface, e.g., an I2C interface.

The sensor hub has its own clock generator (clock) and assigns each sample of the sensor data a so-called "time stamp," so that the host processor may put the sensor data in a temporal context. A separate clock signal is available to the host processor, which also generates it, generally. This clock signal runs asynchronously and independently of the clock generator of the sensor hub. Due to this, it is necessary that time stamps, which the sensor hub assigns to the sensor events, be converted to the time base of the host processor prior to use in the host processor. The conversion requires the multiplication by a factor and the addition of an offset. The exact determination of this factor and this offset is critical for the quality of the converted time stamp.

According to a conventional method for determining the clock factor and the offset, the sensor hub transmits a time stamp, together with the interrupt signal, to the host processor. On the host processor, the interrupt is assigned, in turn, a time stamp regarding the host clock generator signal, which means that the host processor may determine the factor and offset after the occurrence of a plurality of interrupts. In this case, the measurement of the interrupt time stamp with regard to the host clock generator signal is made, using software.

Therefore, it also does not always take place immediately after reception of the interrupt signal, but possibly with an undefined temporal offset, as well, caused by the interrupt reaction delay (interrupt response latency), which is, for example, a function of the capacity utilization of the host processor and the priority of other operations and interrupts. The inaccuracy of measurement with the time stamps results in an inaccurate calculation of the factor and offset. Therefore, a complex filtering algorithm is used, which, in turn, compensates for this inaccuracy within certain limits.

A further disadvantage of this limitation is that a comparison of the sensor-hub time stamp and host-processor time stamp is only possible if an interrupt occurs. Thus, there is exactly one measurement per occurring interrupt. Since, during normal operation, very long times may elapse without interrupts, then, disadvantageously, the accuracy of the factor and offset may be degraded significantly.

SUMMARY

An object of the present invention is to provide measures, which allow time stamps of the time base of a sensor-data processing device to be converted reliably to time stamps of the time base of an external computer device.

According to a first aspect of the present invention, the object may be achieved by a sensor-data processing device, including:
  at least one interface to communicate with at least one sensor element for detecting sensor events;
  at least one interface to communicate with an external computer device for the further processing of sensor data representing the sensor events;
  devices for generating at least one time base specific to the sensor-data processing device; and
  an assignment element for assigning time stamps to the sensor events, the time stamps being based on the time base of the sensor-data processing device and being specific to the sensor-data processing device;
  characterized by
  devices for receiving a request signal from the computer device; using the computer device, the request signal being able to be assigned a time stamp based on a time base specific to the computer device; and
  devices for assigning a time stamp specific to the sensor-data processing device, to this request signal.

In this manner, it is possible to produce a reliable temporal context between the external computer device ("host processor") and a sensor device, using the sensor-data processing device of the present invention. To that end, a request signal of the computer device is used to read in time stamps of the time bases of the computer device and of the sensor-data processing device at a selected time, in order to compare the two time stamps to each other subsequently and, from this, to ascertain conversion parameters for converting time stamps specific to the sensor-data processing device to time stamps specific to the computer device. In this manner, an increased accuracy and reliability may be obtained in converting from time stamps specific to the sensor-data processing device to time stamps specific to the computer device.

According to a second aspect of the present invention, the object may be achieved by a sensor system, including at least:
  a sensor element for detecting sensor events;
  a sensor-data processing device, which is functionally connected to the sensor element, and with the aid of which the sensor events may be assigned a time stamp, which is specific to the sensor-data processing device and corresponds to a time base specific to the sensor-data processing device; and a computer device having a time base specific to the computer device, for the further processing of sensor data representing the sensor events;

the computer device being configured to transmit a request signal to the sensor-data processing device, so that a time-stamp pair including the time stamp specific to the computer device and an associated time stamp specific to the sensor-data processing device may be acquired for the request signal.

According to a third aspect of the present invention, the object may be achieved by a method for determining, within the scope of a sensor system, conversion parameters to convert time stamps of a sensor-data processing device, which are specific to the processing device, to time stamps of a computer device, which are specific to the computer device;

where at least one request signal is transmitted from the computer device to the sensor-data processing device; a time stamp specific to the computer device being assigned to and acquired for the at least one request signal;

where at a time specifically related to the reception, the sensor-data processing device assigns the at least one request signal a time stamp specific to the sensor-data processing device, and the time stamp is acquired, so that one time-stamp pair including the time stamp specific to the computer device and the time stamp specific to the sensor-data processing device is provided per request signal; and where an offset between the time base specific to the computer device and the time base specific to the sensor-data processing device is determined as a first conversion parameter, on the basis of the at least one time-stamp pair.

Preferred specific embodiments of the sensor-data processing device are described herein.

One preferred further refinement of the sensor-data processing device distinguishes itself in that the device for generating the time base specific to the sensor-data processing device includes at least one counting element and has access to a clock generator. In this manner, the clock generator for generating the time base specific to the processing device is, advantageously, not necessarily part of the sensor-data processing device, but may also take the form of an external clock generator.

A further advantageous specific embodiment of the sensor-data processing device is distinguished by at least one register, which the computer device may access; one of the request signals, to which a time stamp specific to the sensor-data processing device is assignable, representing such an instance of register access. In this manner, a device for receiving a request signal from the computer device is specified more precisely.

One further advantageous specific embodiment of the sensor-data processing device is distinguished by an input for the request signals of the computer device, at which the application of the request signals is detectable. Due to this, the request signal may be received and detected by the computer device in a convenient manner.

A further advantageous specific embodiment of the sensor-data processing device is distinguished by a device for determining at least one conversion parameter for converting the time stamps specific to the sensor-data processing device to time stamps specific to the computer device; the at least one conversion parameter being determinable with the aid of at least one time-stamp pair of at least one request signal, the time-stamp pair including the time stamp specific to the computer device and the time stamp specific to the sensor-data processing device.

A further advantageous variant of the sensor-data processing device is distinguished by a device for converting the time stamps of sensor events, specific to the sensor-data processing device, to time stamps specific to the computer device, using at least one conversion parameter, which describes, in particular, an offset and/or a clock ratio between the time base specific to the sensor-data processing device and the time base specific to the computer device.

In this manner, variants of the sensor-data processing device are provided, by which the determination of the conversion parameters and/or the conversion of the time stamps from the time base specific to the processing device to the time base specific to the computer device is carried out in the sensor-data processing device.

In the following, the present invention is described in detail with further features and advantages, in light of several figures.

Revealed features of the device follow analogously from correspondingly revealed features of the method, and vice versa. This means, in particular, that features, technical advantages and variants relating to the sensor device follow analogously from corresponding variants, features and technical advantages relating to the method for operating a sensor device connected functionally to a computer device, and vice versa.

DETAILED DESCRIPTION OF EXAMPLE EMBODIMENTS

Figure 1:
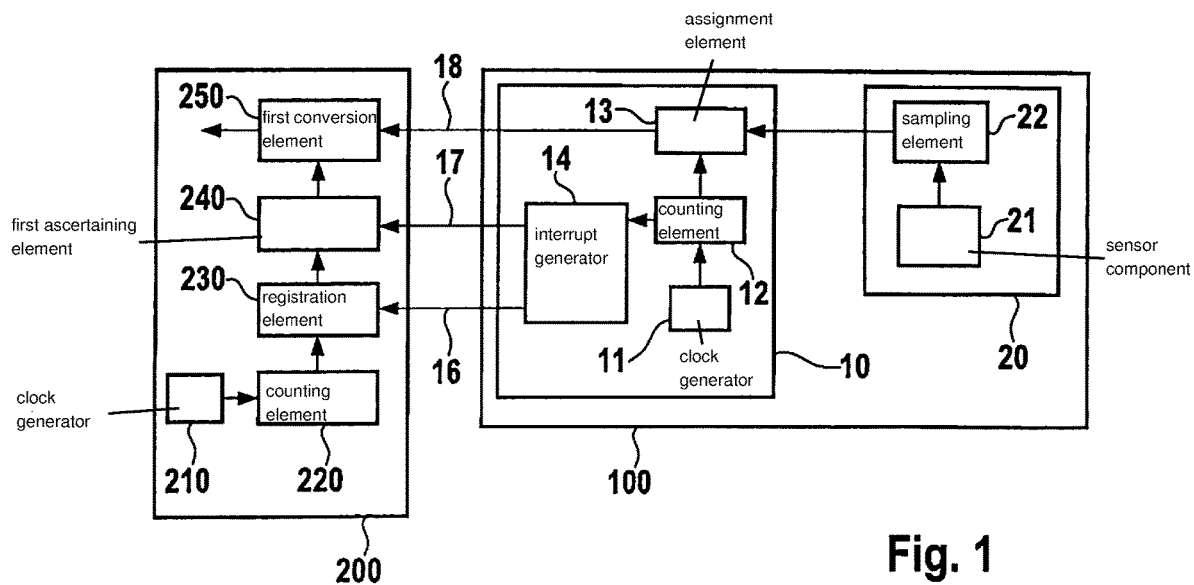
FIG. 1 shows a block diagram of a conventional sensor device including a functionally connected, external computer device.

FIG. 1 shows a basic block diagram of a conventional sensor device 100, which is connected to an external computer device 200, e.g., to the host processor of a cellular phone, of a tablet, or also of another consumer electronics device, and interacts with it. In this case, sensor device 100 includes a sensor element 20 having a sensor component 21, e.g., for measuring an acceleration and/or a yaw rate, and a sampling element 22, which samples the continuous sensor signal at a particular sampling rate and generates, in this manner, a series of sensor-signal samples. These sensor-signal samples are also referred to as sensor events. In addition, sensor device 100 includes a sensor-data processing device 10 ("sensor hub"), to which the sensor signal samples are supplied. Sensor-data processing device 10 has a time base of its own, which is generated with the aid of a clock generator 11 and a counting element 12. Clock generator 11 preferably takes the form of an RC oscillator, which has, for example, a clock frequency of 32 kHz. To generate the time basis specific to the sensor-data processing device, clock generator 11 does not necessarily have to be part of sensor-data processing device 10. For this purpose, an external clock generator (not shown) could also be used.

Each sensor signal sample is provided with a time stamp of this time base specific to the sensor-data processing device. This takes place with the aid of an assignment element 13. In addition, sensor-data processing device 10 includes an interrupt generator 14, which, in certain cases, e.g., in response to detection of a motion, transmits an interrupt signal to the computer device 200 and thereby initiates the start of an interrupt routine on computer device 200; in this case, the interrupt signal being denoted by 16.

Computer device 200 also has its own time base, which is generated with the aid of a separate clock generator 210 and a counting element 220. Clock generator 210 preferably takes the form of a quartz-based oscillator, which has, for example, a clock frequency of 1 GHz. With the aid of a registration element 230, the beginning of the interrupt routine is assigned a time stamp ZS1 specific to the computer device.

In addition to interrupt signal 16, interrupt generator 14 also transmits the interrupt-signal time stamp ZS2 specific to the sensor-data processing device to computer device 200, which is referred to, here, by 17.

On the basis of at least one such time-stamp pair ZS1 and ZS2, conversion parameters for converting time stamps specific to the sensor-data processing device to time stamps specific to the computer device are determined, e.g., an offset between the two time bases and a clock ratio. This is accomplished in a first ascertaining element 240 of computer device 200 with the aid of a complex software algorithm, which may include, e.g., filters for removing outliers, as well. The conversion parameters ascertained in this manner are supplied to a first conversion element 250.

As mentioned above, each sensor-signal sample is assigned a time stamp specific to the sensor-data processing device, with the aid of assignment element 13, before the sensor-signal sample is transmitted, together with this time stamp, to computer device 200 via an interface 18. Using first conversion element 250, the time stamps of the sensor data, specific to the sensor-data processing device, are converted to time stamps of computer device 200. In this manner, the sensor data are put in a specific temporal context of the time base of the computer device for further processing in the computer device.

Since the conventional method explained above is implemented on computer device 200 in a software-based manner, with the aid of the interrupt routine, and is therefore subject to temporal inaccuracy, and since there are operating phases, in which no interrupts occur for a long period of time, the determination of the conversion parameters, in particular, of the offset and of the clock ratio, between the two time bases, is relatively inaccurate. Therefore, measures are proposed, through which the uncertainty in the time-stamp measurement due to the interrupt response latency time in computer device 200 is prevented, and a time-stamp measurement is possible at any time, independent of an interrupt, when computer device 200 and sensor-data processing device 10 are active.

In this manner, a higher accuracy may be obtained in converting the time stamps of the sensor data from the time base specific to the sensor-data processing device to the time base of the computer device, in particular, shortly after a wake-up of computer device 200 by an interrupt signal, but independently of it.

An object of the measures of the present invention is to determine conversion parameters between the time bases of computer device 200 and sensor-data processing device 10 reliably and independently of the capacity utilization of computer device 200. To that end, it is provided that specific instances of register access be used as reference events, for which, in each instance, a time stamp ZS1 specific to the computer device and a time stamp ZS2 specific to the sensor-data processing device are advantageously generated in a hardware-based manner, in order to determine an offset and the clock ratio between the two time bases from these time-stamp pairs.

Figure 2:
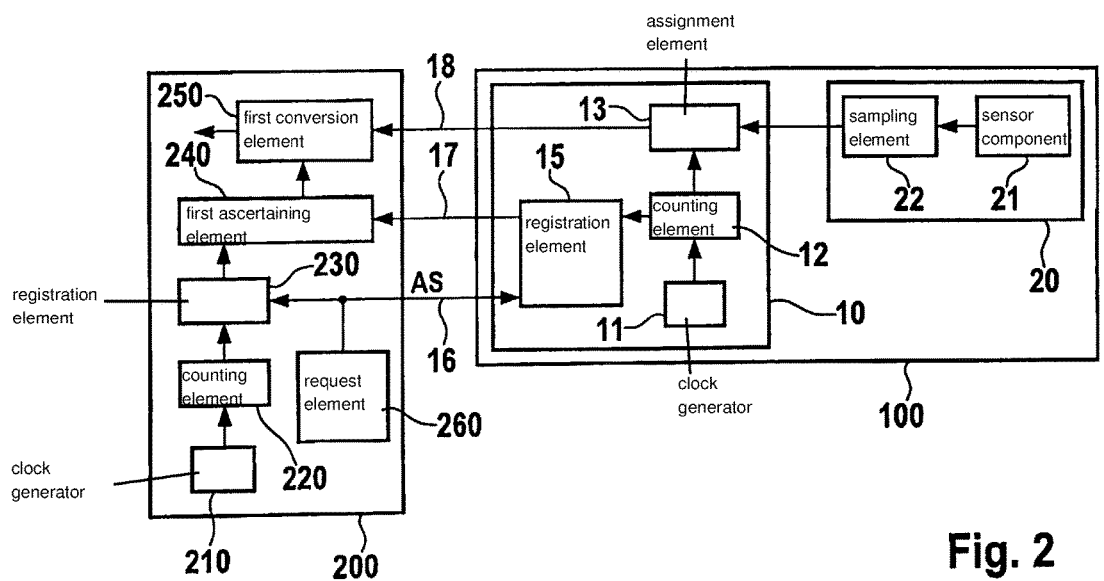
FIG. 2 shows a block diagram of a first specific embodiment of the sensor-data processing device, including a functionally connected, external computer device.

FIG. 2 shows a basic block diagram of a first exemplary embodiment of the present invention. In this case, as well, sensor-data processing device 10 has its own time base, which is generated with the aid of a clock generator 11 and a counting element 12, in the same manner as the computer device 200 has its own time base, which is independent of it and is generated with the aid of a clock generator 210 and a counting element 220.

However, in contrast to the related art described above, computer device 200 includes a so-called request element 260 for generating a request signal AS, which is assigned a time stamp ZS1 specific to the computer device with the aid of registration element 230 and is transmitted to sensor-data processing device 10. This is equipped with a device 15 for receiving such a request signal AS. In the following, this device is referred to as registration element 15. In the exemplary embodiment represented here, registration element 15 also assigns each request signal AS a time stamp ZS2 specific to the sensor-data processing device, so that a time-stamp pair is generated for each request signal AS of computer device 200. Thus, using a request signal AS, external computer device 200 may trigger an event for initiating an essentially simultaneous time-stamp registration in computer device 200 and in sensor-data processing device 10. Request signal AS may be, for example, write access to registration element 15.

On the basis of the time-stamp pairs acquired in this manner, conversion parameters for converting the time stamps specific to the sensor-data processing to time stamps specific to the computer device may now be determined. In particular, an offset and the clock ratio between the two time bases may be calculated from a plurality of time-stamp pairs ZS1, ZS2 acquired in this manner, and may be updated in succession with new time-stamp measurements.

In the exemplary embodiment of the present invention represented in FIG. 2, the calculations necessary for this are carried out in computer device 200, namely, in ascertaining element 240. To that end, the time stamps ZS2 specific to the sensor-data processing device and the time stamps ZS1 specific to the computer device, of the request signals AS, are transmitted to ascertaining element 240 of computer device 200. The conversion parameters determined here are then supplied to conversion element 250, which carries out the actual conversion of the time stamps of sensor data, specific to the sensor-data processing, to time stamps specific to the computer device.

It is important for the performance of the system, that the measurements of time stamps ZS1, ZS2 be made as simultaneously as possible. To that end, the elements necessary for measuring time stamps ZS1, ZS2 are advantageously implemented as hardware, in order to eliminate software influences, in particular, the interrupt response latency.

In the set-up of FIG. 2, the named units advantageously implemented as hardware on the side of computer device 200 and on the side of the sensor-data processing device are registration elements 230 and 15, respectively. In this context, registration element 230 is advantageously already present in electronic computer devices 200 customary in the market. Thus, after an instance of register access to an external device, there is, there, the option of requesting the exact time of the register access. In response to access to the first registration element 15 of sensor-data processing unit 10, a so-called event interrupt is advantageously initiated, which is provided in hardware with time stamp ZS2.

Figure 3:
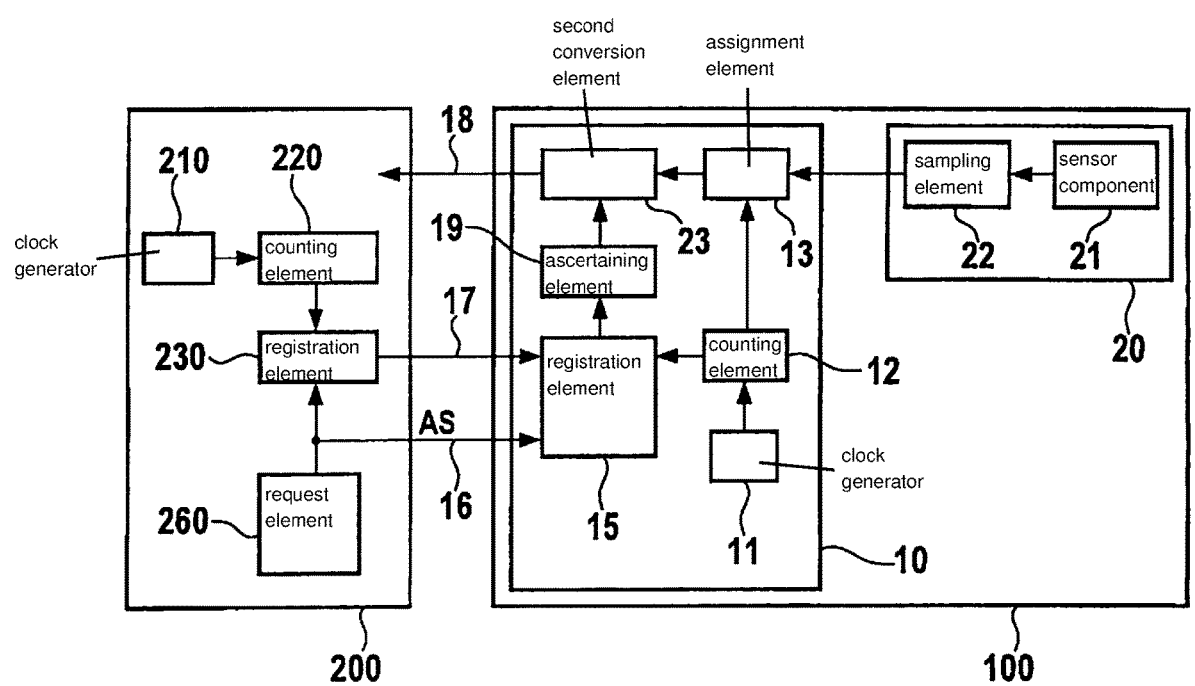
FIG. 3 shows a block diagram of a further specific embodiment of a sensor-data processing device, including a functionally connected, external computer device.

The second exemplary embodiment of the present invention represented in FIG. 3 differs from the first exemplary embodiment represented in FIG. 2, in that the determination of the conversion parameters and the conversion of the time stamps of the sensor data, specific to the sensor-data processing device, to time stamps specific to the computer device, do not take place in computer device 200, but in the sensor-data processing device, namely, in a second ascertaining element 19 and a second conversion element 23. To that end, computer device 200 transmits the time stamp ZS1 of request signal AS, specific to the computer device, to sensor-data processing device 10, using, for example, an instance of further register access to registration element 15.

The time stamps of the sensor events or sensor data of sensor-data processing device 10 are converted to the time base or time domains of computer device 200, using second ascertaining element 19, before they are transmitted by second conversion element 23 to computer device 200.

In a further variant of sensor device 100 not shown in the figures, a filter may be used for calculating the offset and the factor, in order to compensate for remaining measurement inaccuracies. In this context, it is assumed that the two clock generators 11, 210 have short-term stability and only a very low jitter. This variant is applicable to both the specific embodiment of proposed sensor-data processing device 10 of FIG. 2, and the above-mentioned variant.

In a further variant of sensor-data processing device 10 not represented in the figures, it is possible for a plurality of consecutive acquisitions of time stamps ZS1, ZS2 to be provided for calculating the factor. If the time stamps of the sensor data are intended to be converted already after the first measurement, a nominal factor between clock generator 210 of computer device 200 and clock generator 11 of sensor-data processing device 10 may be applied up to the second acquisition.

In a further variant of sensor-data processing device 10 not represented in the figures, it is provided that instead of an instance of register access for triggering the time-stamp acquisition, a trigger signal 16 independent of the interface be used as well. In this case, for example, an additional connecting line between computer device 200 and sensor-data processing device 10 is necessary.

In a further variant (not shown), it may be provided that sensor-data processing device 10 and sensor element 20 be implemented in the form of components independent of each other.

Figure 4:
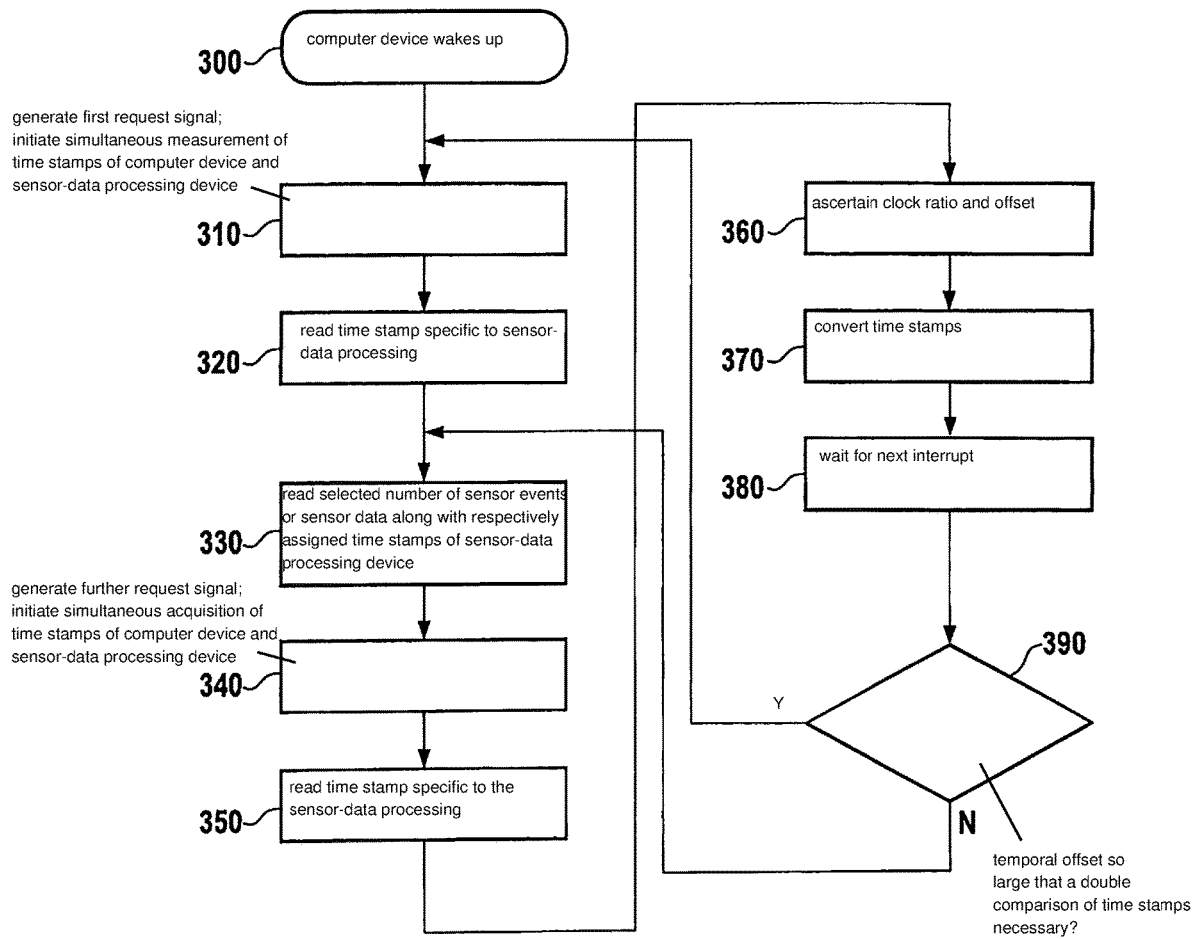
FIG. 4 shows a basic flow chart of a method for operating a proposed sensor-data processing device.

FIG. 4 shows a flow chart for a variant of a method for operating a sensor system according to the present invention. In the exemplary embodiment described here, the determination of the conversion parameters, and also the conversion of the time stamps of the sensor data, specific to the sensor-data processing device, to time stamps specific to the computer device, is carried out in the computer device.

In step 300, computer device 200 is woken up due to an interrupt of the sensor-data processing device. In this case, it is assumed that computer device 200 has been inactive for an indefinite period of time, and that the clock generators 210, 11 of computer device 200 and of sensor-data processing device 10 may have drifted significantly.

In step 310, a first request signal AS is generated with the aid of request element 260. As described above, since this request signal AS is assigned a time stamp ZS1, ZS2 from both computer device 200 and sensor-data processing device 10, in this step 310, a first substantially simultaneous measurement of time stamps ZS1, ZS2 of computer device 200 and sensor-data processing device 10 is initiated.

In step 320, computer device 200 accesses sensor-data processing device 10, in order to read the time stamp ZS2 of request signal AS, specific to the sensor-data processing.

In a method step 330 independent of it, a selected number of sensor events or sensor data of sensor device 100, along with the respectively assigned time stamps of sensor-data processing device 10, are read by computer device 200.

In step 340, with the aid of request element 260, a further request signal AS is generated, and thus, a further, substantially simultaneous acquisition of time stamps ZS1, ZS2 of computer device 200 and of sensor-data processing device 10 is initiated for further request signal AS. It is important that there be a temporal offset between the two time-stamp acquisitions in steps 310 and 330, in order that not only an offset, but also a clock ratio between the two time bases of computer device 200 and sensor-data processing device 10 may be determined.

In step 350, computer device 200 then accesses sensor-data processing device 10 again, in order to read the time stamp ZS2 of further request signal AS, specific to the sensor-data processing, as well. Subsequently, the time stamps ZS1 and ZS2, which are specific to both the computing device and the sensor-data processing and are of at least two request signals AS generated at different times, are available to computer device 200.

In step 360, a clock ratio and an offset between the time bases of computer device 200 and sensor-data processing device 10 are ascertained on the basis of these time-stamp pairs ZS1, ZS2, using, for example, linear interpolation.

In step 370, with the aid of these conversion parameters ascertained in step 360, the time stamps of the sensor events or sensor data, which are specific to the sensor-data processing device and were transmitted to computer device 200 in step 330, are converted to the time base of computer device 200.

Computer device 200 then waits for the next interrupt of sensor-data processing device 10, which is depicted here as step 380. In the case of such an interrupt, then, in step 390, computer device 200 decides, e.g., based on the time elapsed, if the temporal offset of clock generators 11, 210 may have become so large, that a double comparison of time stamps is necessary (branch Y). In this case the method is continued at step 310. In the case in which a single time-stamp comparison suffices for updating the conversion parameter (branch N), the method is continued at step 330.

Finally, once more, it should be explicitly noted that all of the components, which are used for implementing the sensor-data processing device of the present invention, the sensor system of the present invention, and the example method in accordance with the present invention for determining conversion parameters for converting time stamps of the time base of a sensor-data processing device to time stamps of a computer device, may be implemented both in the form of software and in the form of hardware components, or also by a combination of software with hardware.

What is claimed is:
1. A sensor-data processing device, comprising:
  at least one interface configured to communicate with at least one sensor element for detecting sensor events;
  at least one interface configured to communicate with at least one external computer for processing sensor data representing the sensor events;

a generator configured for generating a time base specific to the sensor-data processing device;

an assignor configured for assigning time stamps, which are based on the time base of the sensor-data processing device and are specific to the sensor-data processing device, to the sensor events; and a receiver configured for receiving a request signal from the at least one external computer, wherein with the aid of the at least one external computer, the request signal is assigned a time stamp based on a time base specific to the at least one external computer, and wherein the receiver is configured as an assignor which is configured for assigning a time stamp specific to the sensor-data processing device, to the request signal, wherein the request signal of the at least one external computer is configured to trigger a simultaneous generation of a time stamp of the time base of the at least one external computer and a time stamp of the time base of the sensor-data processing device to compare the two time stamps to each other subsequently, and to ascertain conversion parameters for converting time stamps specific to the sensor-data processing device to time stamps specific to the at least one external computer, wherein a simultaneous measurement of the time stamp of the at least one external computer and the time stamp of the sensor-data processing device occurs, wherein on the basis of at least two time-stamp pairs, a conversion parameter is ascertained, the conversion parameter including a clock ratio between the time base specific to the sensor-data processing device and the time base specific to the at least one external computer, wherein the clock ratio is calculated in an ascertaining element of the at least one external computer, wherein the at least two time-stamp pairs are transmitted to the ascertaining element, and the conversion parameter is transmitted to a conversion element which carries out the conversion of the time stamps.

2. The sensor-data processing device as recited in claim 1, wherein the generator for generating the time base specific to the sensor-data processing device includes at least one counting element and has access to a clock generator.

3. The sensor-data processing device as recited in claim 1, further comprising:

at least one register, which the at least one external computer may access; the request signal, to which the time stamp specific to the sensor-data processing device is assigned, representing an instance of a register access.

4. The sensor-data processing device as recited in claim 1, further comprising:

an input for the request signal of the at least one external computer, application of the request signal being detectable at the input.

5. The sensor-data processing device as recited in claim 1, further comprising:

a determiner for determining at least one conversion parameter for converting the time stamps specific to the sensor-data processing device to the time stamps specific to the at least one external computer, the at least one conversion parameter being determinable with the aid of at least one time-stamp pair of the request signal, the at least one time-stamp pair including a time stamp specific to the at least one external computer and an associated time stamp specific to the sensor-data processing device.

6. The sensor-data processing device as recited in claim 1, further comprising:

a converter configured to convert the time stamps of sensor events, specific to the sensor-data processing device, to time stamps specific to the computer, using at least one conversion parameter, which describes at least one of an offset and a clock ratio between the time base specific to the sensor-data processing device and the time base specific to the computer.

7. The sensor-data processing device as recited in claim 1, wherein a plurality of consecutive acquisitions of the time stamps are provided.

8. A sensor system, comprising:

a sensor element configured for detecting sensor events;

a sensor-data processing device functionally connected to the sensor element, with the aid of which the sensor events may be assigned a time stamp, which is specific to the sensor-data processing device and corresponds to a time base specific to the sensor-data processing device, the sensor-data processing device including at least one interface to communicate with the sensor element, at least one interface to communicate with an external computer for processing sensor data representing the sensor events, a generator for generating a time base specific to the sensor-data processing device, an assignor configured for assigning time stamps, which are based on the time base of the sensor-data processing device and are specific to the sensor-data processing device, to the sensor events, a receiver for receiving a request signal from the external computer, wherein with the aid of the external computer, the request signal is assigned a time stamp based on a time base specific to the external computer, wherein the received is configured as an assignor which is configured for assigning a time stamp specific to the sensor-data processing device, to the request signal; and the external computer, the external computer having a time base specific to the external computer, for processing sensor data representing the sensor events, the external computer being configured to transmit the request signal to the sensor-data processing device, a time-stamp pair, which includes the time stamp specific to the external computer and an associated time stamp specific to the sensor-data processing device, being acquired for the request signal, wherein the request signal of the external computer is configured to trigger a simultaneous generation of a time stamp of the time base of the external computer and a time stamp of the time base of the sensor-data processing device to compare the two time stamps to each other subsequently, and to ascertain conversion parameters for converting time stamps specific to the sensor-data processing device to time stamps specific to the external computer, wherein a simultaneous measurement of the time stamp of the external computer and the time stamp of the sensor-data processing device occurs, wherein on the basis of at least two time-stamp pairs, a conversion parameter is ascertained, the conversion parameter including a clock ratio between the time base specific to the sensor-data processing device and the time base specific to the external computer, wherein the clock ratio is calculated in an ascertaining element of the external computer, wherein the at least two time-stamp pairs are transmitted to the ascertaining element, and the conversion parameter is transmitted to a conversion element which carries out the conversion of the time stamps.

9. The sensor system as recited in claim 8, wherein the time stamp specific to the external computer is generated with the aid of a clock generator of the external computer, and the time stamps specific to the sensor-data processing device are generated with the aid of a clock generator of the sensor-data processing device, and wherein frequencies of the clock generator of the sensor-data processing device and frequencies of the clock generator of the external computer are at a fixed ratio to each other for at least a specific period of time.

10. The sensor system as recited in claim 8, wherein at least one of the sensor-data processing device and the external computer, includes a determiner for determining at least one conversion parameter for converting the time stamps specific to the sensor-data processing device to the time stamps of the external computer, specific to the external computer; and the at least one conversion parameter is determined with the aid of at least one time-stamp pair of one of the request signals, the at least one time-stamp pair including a time stamp specific to the external computer and an associated time stamp specific to the sensor-data processing device, and the at least one conversion parameter describes at least one of an offset and a clock ratio between the time base specific to the sensor-data processing device and the time base specific to the external computer.

11. The sensor system as recited in claim 10, wherein at least one of the sensor-data processing device and the external computer, includes a converter configured to convert the time stamps of sensor events, specific to the sensor-data processing device, to time stamps specific to the external computer, on the basis of the at least one conversion parameter, the at least one conversion parameter including at least one of an offset and a clock ratio between the time base specific to the sensor-data processing device and the time base specific to the external computer.

12. A method for determining conversion parameters to convert time stamps of a sensor-data processing device, specific to the sensor-data processing device, to time stamps of a computer, specific to the computer, the method comprising:
    transmitting, by the computer, at least one request signal to the sensor-data processing device, a time stamp specific to the computer being assigned to and acquired for the at least one request signal;
    at a time specifically related to the reception, the sensor-data processing device assigning the at least one request signal a time stamp specific to the sensor-data processing device, and the time stamp is acquired, so that one time-stamp pair including the time stamp specific to the computer and the time stamp specific to the sensor-data processing device is provided per request signal; and
    determining a first conversion parameter on the basis of the at least one time-stamp pair, the first parameter including an offset between the time base specific to the computer and the time base specific to the sensor-data processing device,
    wherein the request signal of the computer is configured to trigger a simultaneous generation of a time stamp of the time base of the computer and a time stamp of the time base of the sensor-data processing device to compare the two time stamps to each other subsequently, and to ascertain conversion parameters for converting time stamps specific to the sensor-data processing device to time stamps specific to the computer, wherein a simultaneous measurement of the time stamp of the computer and the time stamp of the sensor-data processing device occurs,
    wherein on the basis of at least two time-stamp pairs, a second conversion parameter is ascertained, the second conversion parameter including a clock ratio between the time base specific to the sensor-data processing device and the time base specific to the computer,
    wherein the clock ratio is calculated in an ascertaining element of the computer, wherein the at least two time-stamp pairs are transmitted to the ascertaining element, and the second conversion parameter is transmitted to a conversion element which carries out the conversion of the time stamps.

13. The method as recited in claim 12, wherein the determination of the at least one conversion parameter is based on at least two time-stamp pairs; the determination of the at least one conversion parameter being carried out, using a linear approximation of the at least two time-stamp pairs.

14. The method as recited in claim 12, wherein a filter is used for the determination of the at least one conversion parameter.

15. A sensor-data processing device, comprising:
    at least one interface configured to communicate with at least one sensor element for detecting sensor events;
    at least one interface configured to communicate with at least one external computer for processing sensor data representing the sensor events;
    a generator configured for generating a time base specific to the sensor-data processing device;
    an assignor configured for assigning time stamps, which are based on the time base of the sensor-data processing device and are specific to the sensor-data processing device, to the sensor events; and
    a receiver configured for receiving a request signal from the at least one external computer, wherein with the aid of the at least one external computer, the request signal is assigned a time stamp based on a time base specific to the at least one external computer, and wherein the receiver is configured as an assignor which is configured for assigning a time stamp specific to the sensor-data processing device, to the request signal,
    wherein the request signal of the at least one external computer is configured to trigger a simultaneous generation of a time stamp of the time base of the at least one external computer and a time stamp of the time base of the sensor-data processing device to compare the two time stamps to each other subsequently, and to ascertain conversion parameters for converting time stamps specific to the sensor-data processing device to time stamps specific to the at least one external computer.

\* \* \* \* \*